(12) United States Patent
White et al.

(10) Patent No.: US 7,953,777 B2
(45) Date of Patent: May 31, 2011

(54) METHOD AND SYSTEM FOR RETRIEVING AND ORGANIZING WEB MEDIA

(75) Inventors: William White, Oakland, CA (US); Steven Horowitz, Berkeley, CA (US)

(73) Assignee: Yahoo! Inc., Sunnyvale, CA (US)

(*) Notice: Subject to any disclaimer, the term of this patent is extended or adjusted under 35 U.S.C. 154(b) by 463 days.

(21) Appl. No.: 12/110,144

(22) Filed: Apr. 25, 2008

(65) Prior Publication Data

US 2009/0271416 A1    Oct. 29, 2009

(51) Int. Cl.
G06F 17/30    (2006.01)

(52) U.S. Cl. ......... 707/913; 707/916; 709/203; 709/219
(58) Field of Classification Search .......... 707/912–916; 709/203, 219
See application file for complete search history.

(56) References Cited

U.S. PATENT DOCUMENTS

| | | | |
|---|---|---|---|
| 6,029,182 A * | 2/2000 | Nehab et al. .................. 715/205 |
| 2003/0105589 A1 * | 6/2003 | Liu et al. ........................... 702/1 |
| 2004/0139157 A1 * | 7/2004 | Neely et al. .................... 709/205 |
| 2004/0199809 A1 * | 10/2004 | Hanam et al. ..................... 714/4 |
| 2006/0173888 A1 * | 8/2006 | Narahara et al. .............. 707/102 |
| 2006/0253547 A1 * | 11/2006 | Wood et al. .................... 709/217 |
| 2007/0078828 A1 * | 4/2007 | Parikh et al. ...................... 707/3 |
| 2008/0040426 A1 * | 2/2008 | Synstelien et al. ............ 709/203 |
| 2009/0043786 A1 * | 2/2009 | Schmidt et al. ............... 707/100 |
| 2009/0287559 A1 * | 11/2009 | Chen et al. ................. 705/14.23 |

* cited by examiner

*Primary Examiner* — Leslie Wong
(74) *Attorney, Agent, or Firm* — Hickman Palermo Truong & Becker LLP

(57) ABSTRACT

A system and method which may allow a user to drag and drop a Uniform Resource Locator (URL) of a web page onto a media sink on the desktop of the user's computer to download media which may be embedded in or linked to from the web page, so the media may be saved them locally for future consumption. The system may allow a user to subscribe to a URL so that the system may monitor new media as it becomes available at the URL and automatically download the new media. The system may also analyze web media content and its metadata that a user has downloaded, infer the user's preferences, search for web media based on the user's preferences, and recommend web media to the user. The system may consider what other users have downloaded when recommending web media to the user.

20 Claims, 5 Drawing Sheets

METHOD AND SYSTEM FOR RETRIEVING AND ORGANIZING WEB MEDIA

BACKGROUND

1. Field of the Invention

The present invention relates generally to downloading materials from the Internet.

2. Description of Related Art

The Internet has become a major platform for distributing and sharing information. Everyday, web media, including text files, pictures, audio clips, video clips, MP3 files, etc., may be uploaded to the Internet. A user may be very interested in some web media, but may not have enough time to look at, download and organize them. Some web media may be placed on the Internet only temporarily, and may be removed before a user has time to browse, look at, or otherwise consume them. In addition, some web media may belong to a category in which a user is interested, but the user may not realize that the media exist.

Therefore, it may be desirable to provide a system and method which may help users to retrieve and organize web media.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a system and method which may allow a user to drag and drop a Uniform Resource Locator (URL) of a web page onto a media sink on the desktop of the user's computer to download media embedded or referenced by the web page and save them locally for future consumption. The system may allow a user to subscribe to a URL so that the system may monitor new media which is embedded or linked to from the document retrieved from the URL and automatically download the new media. The system may also search alternative embodiments of the document which is returned from the URL. For example, retrieving an associated RSS (Really Simple Syndication) or ATOM syndication feed which is linked using the HTML <link rel="alternate"> element. The system may also use content or metadata analysis to derive more information about a particular piece of web media a user has downloaded. Based upon usage, the system may infer the user's preferences, search for web media based on the user's preferences, and recommend web media to the user. The system may consider what other users have downloaded when recommending web media to the user. The invention may be carried out by computer-executable instructions, such as program modules. Advantages of the present invention will become apparent from the following detailed description.

Figure 1:
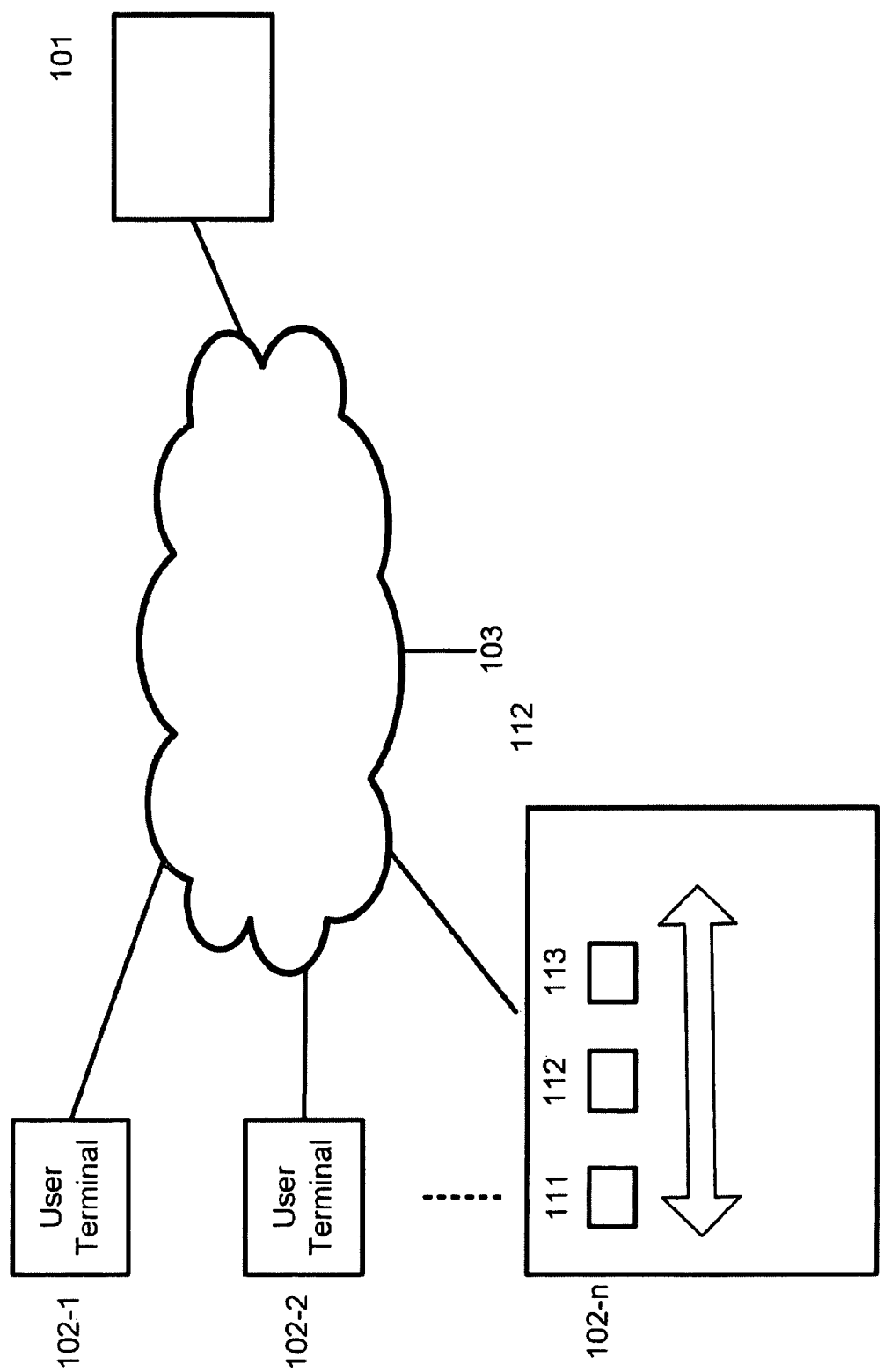
FIG. 1 illustrates an exemplary environment in which a system of the present invention may be used.

FIG. 1 illustrates an exemplary environment in which a system for retrieving and organizing web media according to the present invention may be used. As shown, an Internet server 101 may communicate over a network 103 with a number of user terminals 102-1, 102-2, ... 102-n. The Internet server 101 may be a computer system and may control the operation of a website or a blog. The user terminals 102 may be personal computers, handheld or laptop devices, microprocessor-based systems, set top boxes, or programmable consumer electronics. Each user terminal may be a computer system, which may include one or more of a screen, an input device, a processing unit, memory devices (including a local disk 111), and a system bus coupling various components in the computer system. An operating system 112 of the user terminal may respond to a user input by managing tasks and internal system resources and processing system data.

Each user terminal may have a browser application 113 configured to receive and display web pages, which may include text, graphics, multimedia, etc. The web pages may be based on, e.g., HyperText Markup Language (HTML) or extensible markup language (XML). Network connectivity may be wired or wireless, using one or more communications protocols, as will be known to those of ordinary skill in the art.

Figure 2:
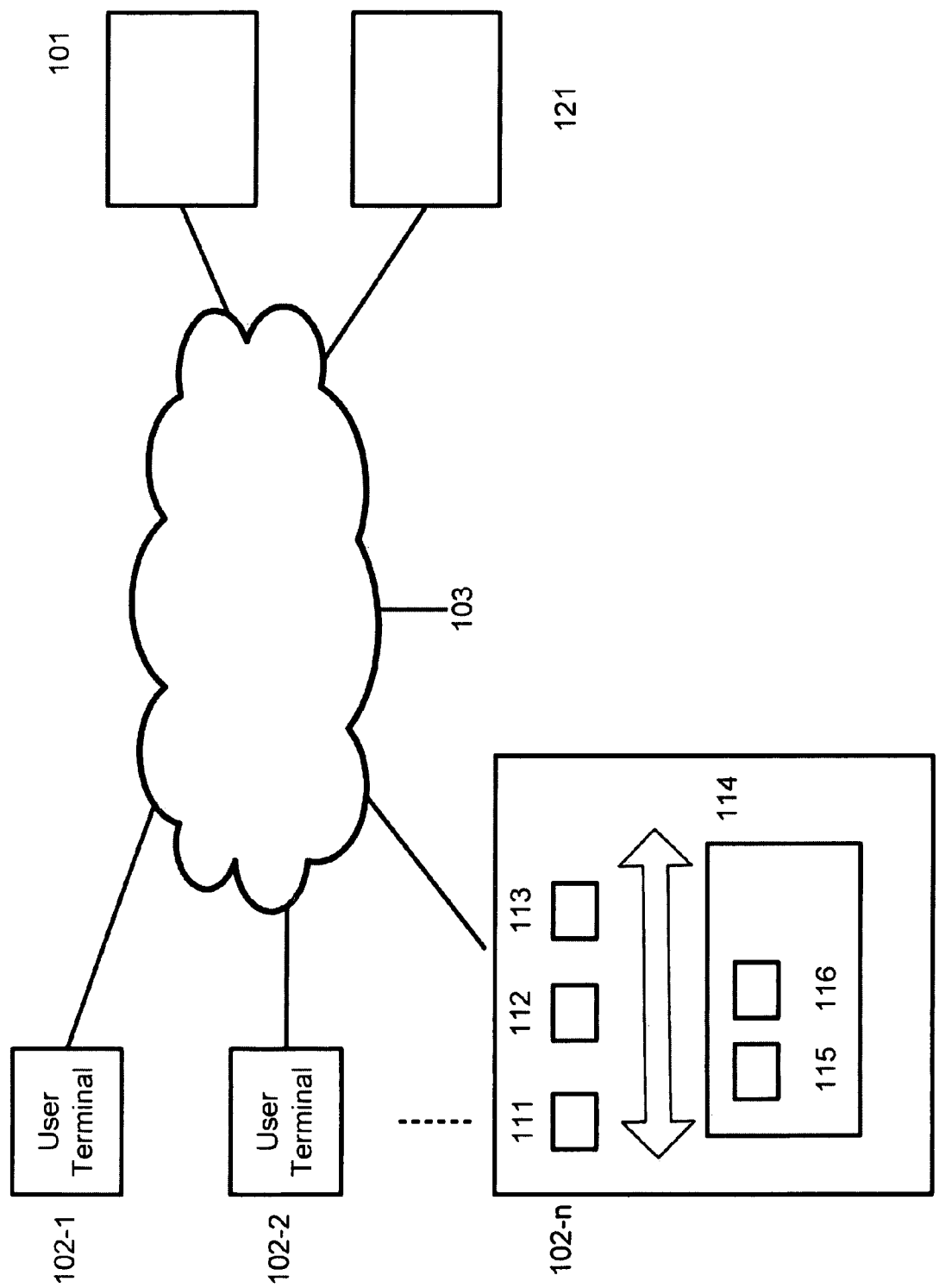
FIG. 2 illustrates a system for retrieving and organizing web media according to one embodiment of the present invention.

FIG. 2 illustrates a system for retrieving and organizing web media according to one embodiment of the present invention, used in the exemplary environment shown in FIG. 1. As shown, a media sink 114 may be installed in a user terminal. The media sink 114 may be an application program and may interact with the local disk 111, the operating system 112, and the Internet browser 113.

When a user selects the media sink 114, e.g., by double clicking its icon, a user interface of the media sink 114 may be displayed. The user interface may include a "New" folder for newly received media which have not been reviewed by the user, and a number of named folders created by the user to organize media he wants to keep. The media may be organized by, e.g., their authors, titles, subjects or artists. A user may move media between the folders. When the user has time, he may review the web media in the "New" folder, deleting web media he does not want to keep, and moving web media he wants to keep to a named folder. The user may also name the media files by, e.g., their authors, titles, subjects or artists. In one embodiment, the user may move the named folders to his local drive, so that he can consume the media even when he is working locally on his terminal, i.e. without an Internet connection. In another embodiment, the user may move some of the named folders to an Internet server, e.g., an external server 121, so that he can consume the media at any computer, and will not lose his collections when his computer is lost or broken.

The user interface of the media sink 114 may have a number of operating buttons, which may include: Organize, Search, Delete, Rename, Subscribe, Recommend, Rate, etc. In one embodiment, a pull-down menu under the "Organize" button may allow the user to create a folder to organize media, name/rename a media folder or delete a media folder. The "Search" button may allow the user to search for a saved media file by, e.g., its author, title, subject and/or artist. The "Delete" button may allow the user to delete a media file he does not want to keep, and the "Rename" button may allow the user to rename a media file. The "Subscribe" button may allow the user to subscribe to one or more URLs to automatically receive updates. The "Recommend" button may allow the user to ask the system to recommend media meeting criteria set by the user, e.g., a particular singer's songs. The "Rate" button may allow the user to associate a rating (e.g. 5 stars) to a media file.

The media sink 114 may have a control module 115 which may control various processes of the media sink, including but not limited to those described below with reference to FIGS. 3, 4 and 5.

The media sink 114 may have an analyzing module 116 which may infer a user's taste based on what web media the user has kept and what web media the user has deleted, the user's rating for the media, analyze whether a certain media file matches the inferred taste or meets criteria set by the user, and recommend to the user one or more media files according to the analysis. In one embodiment, when there are at least two media files which are worth recommending, the analyzing module 116 may further rank the media files and recommend the media files according to their rankings. It should be understood that the analyzing module 116 may not need the Internet connection.

The system may also have an external server 121 which may act as a remote version of the media sink 114 and communicate with a user terminal via the network 103. The external server 121 may have a centralized depository 122 for storing web media. A user may register with the external server 121 to store his web media at the remote server so that he can access his media files from any computer. The remote server 121 may infer preferences of each of its registered users. When recommending web media to one user, the remote server 121 may consider media files a user with similar preferences has kept and any ratings associated with those media files.

Figure 3:
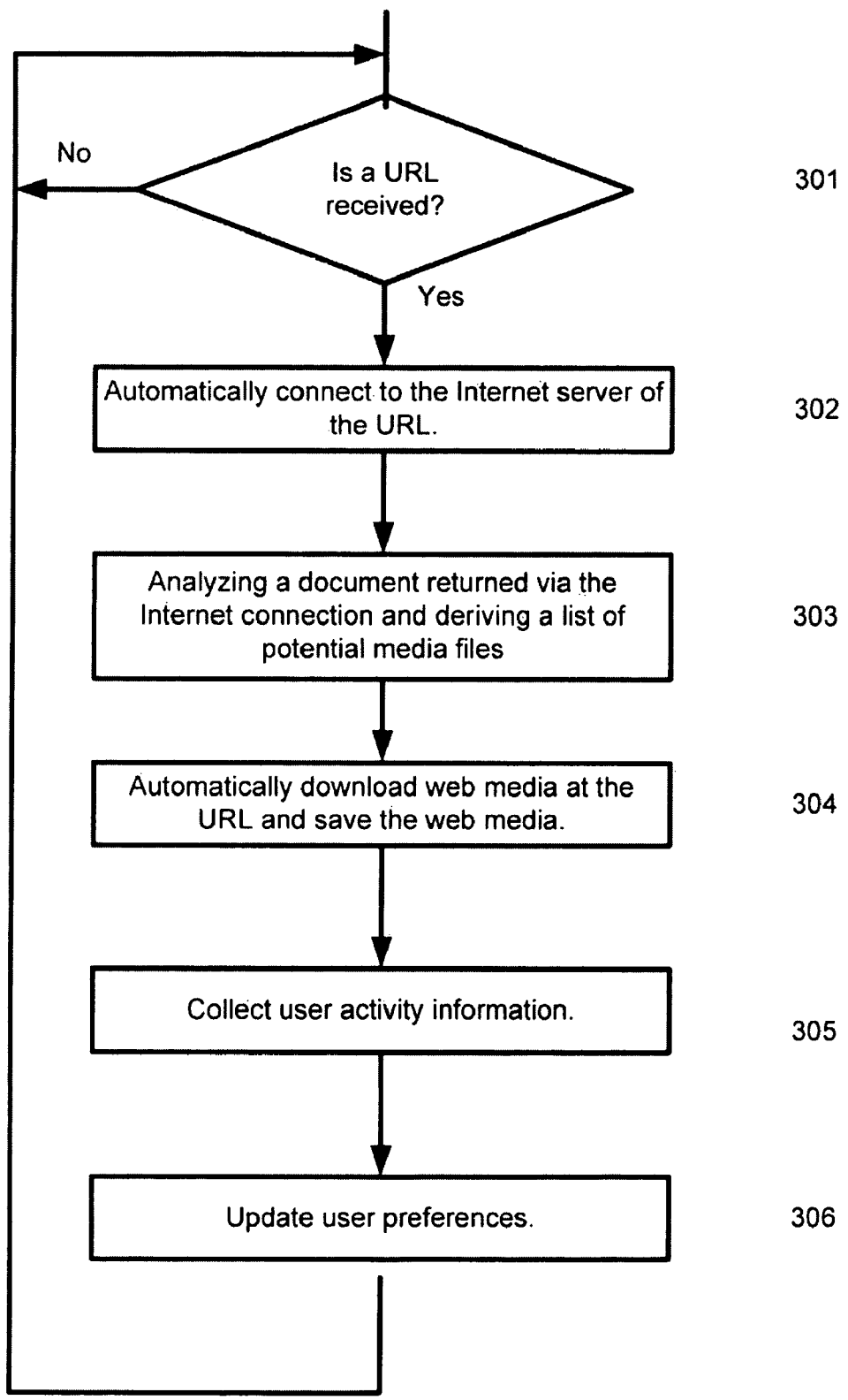
FIG. 3 illustrates a flow chart of a method for retrieving and organizing web media according to one embodiment of the present invention.

FIG. 3 illustrates a flow chart of a method for retrieving and organizing web media according to one embodiment of the present invention. In this embodiment, a user may find that a web page may have media files he is interested in. Because the user may not have time to listen to every tune or look at every video at that moment, he may drop the URL of the web page onto the media sink 114, so that he may consume the web media later.

At 301, a user may drag the URL of a web page and drop it onto the media sink 114 on the desktop of his computer.

At 302, the control module 115 may automatically make an HTTP request to the URL, through the web browser, to open an Internet connection with the Internet server of the web page.

At 303, the control module 115 may analyze the document returned in the HTTP request to derive a list of potential media documents. The control module may use a variety of different methods to derive a list of web media contained or linked from the document returned by the HTML Request, including checking for markup or HTML element attributes which may not currently exist or be in wide use as of yet. Example methods that could be used to identify a hyperlinked document as media include looking at the file name extension of each hyperlink returned in the HTML document identified by the URL and comparing to a list of known media files (e.g., mp3, .wma, .flv, etc.). Another method would be to check the HTML document for the existence of media related microformats such as hAudio (<http://microformats,org/wiki/haudio>). Still another method would be to check for the existing of alternative documents referenced by the document in question, identified using the <link rel="alternate"> element, and then generating separate HTTP requests to download and analyze each of these alternative embodiments of the document referenced by the given URL. One method for identifying media embedded in these feeds would be by checking for the existence of RSS enclosures (<http://en.wikipedia.org/wiki/RSS Enclosures>) in RSS documents or for media links (<http://www.ibm.com/developerworks/xml/library/x-atom10.html#code4>) in ATOM documents.

At 304, the control module may interact with the Internet server which is hosting the individual media content and the operating system may automatically download the media files at each media URL identified at 303 and save them on the local disk 111, e.g., in the "New" folder. In one embodiment, the referring URL and the time of downloading may be used to name media files. The control module may save the author, title and artist as metadata together with a media file. In another embodiment, the author, title and/or artist may be retrieved from metadata stored within the file itself, such as an ID3 tag and used to name the media file.

In one embodiment, the newly downloaded media files may be presented to the user in the sequence in which they are received. In another embodiment, the control module 115 may compare newly downloaded media files with user preferences, and present the media file the user is most likely to like first, and the media file the user is least likely to like last. The user preferences may be preset by the user. Alternatively, the user preferences may be created by the analyzing module 116 by analyzing the user's previous activities, i.e., what media files the user has kept, and what media files the user has deleted, any ratings the user associated with media files, and inferring the authors, artists, title and subjects the user may like or dislike.

The user may consume the saved media files when he has time. He may delete media files he is not interested in and move media files he is interested in to a named folder. The user may rate media files. The user may tag a media file with a label and then categorize the different media based upon the tags which they create. The user's activities may be recorded at 305, and the user preferences may be updated at 306. The process may then return to 301.

It should be understood that 305 and 306 may not require an Internet connection. With the media sink, the user may not have to manually open each web page, listen to or look at each web media before downloading. Consequently, the user may easily build up a library of web media he likes.

Figure 4:
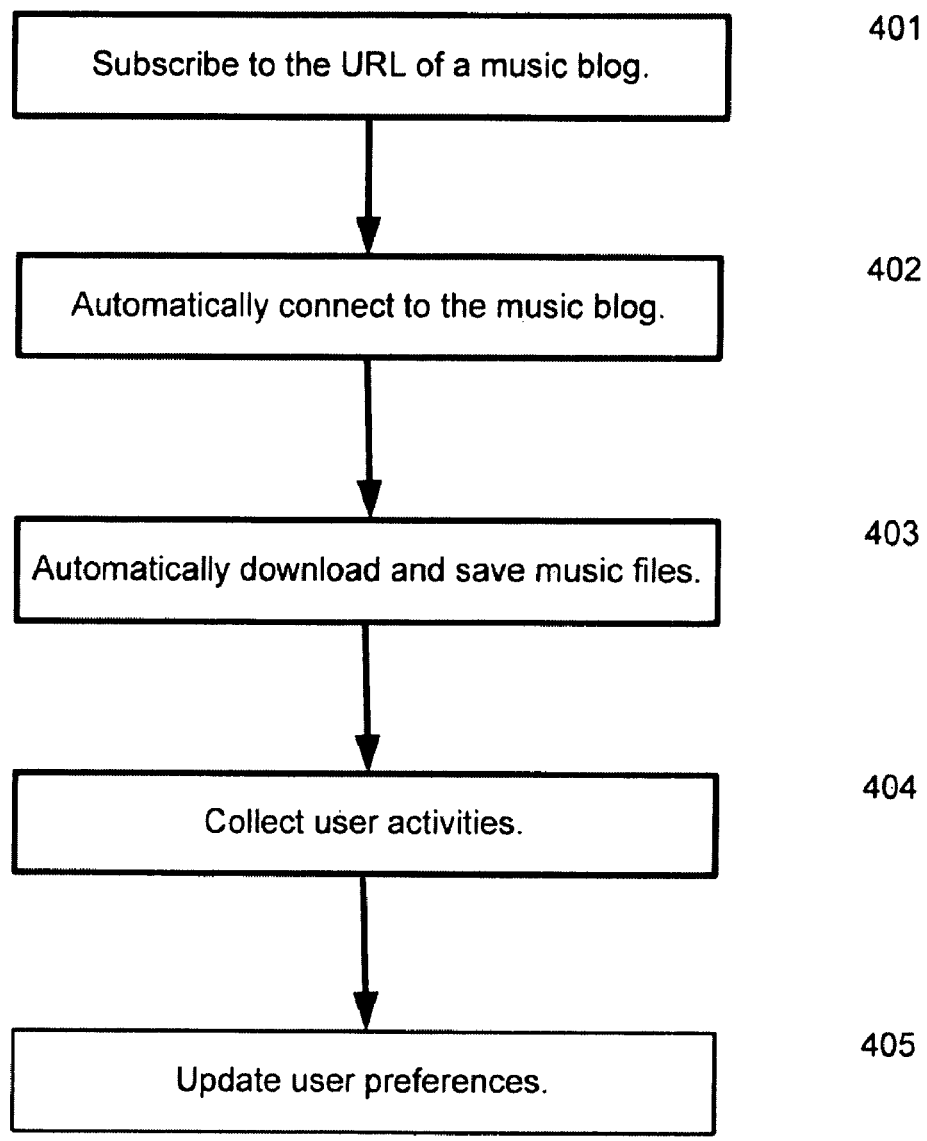
FIG. 4 illustrates a flow chart of a method for retrieving and organizing web media according to another embodiment of the present invention.

FIG. 4 illustrates a flow chart of a method for retrieving and organizing web media according to another embodiment of the present invention. In this embodiment, a user may like a music blog and does not want to miss its updates.

At 401, the user may click on the "Subscribe" button on the user interface of the media sink 114, and then input the URL of a music blog, for example.

At 402, the control module 115 may automatically make an HTTP request to the URL of the music blog to get connected to the music blog's Internet server.

At 403, the control module 115 may interact with the Internet server of the web page and the operating system to automatically download the music files referenced at the URL and save them on the local disk 111, e.g., in a "Subscription" folder. The control module 115 may give each music file a temporary name when saving them. The temporary name may include, e.g., blog post title, blog title, media creator, and title of a music file, and the URL. The control module 115 may try to connect to the music blog and obtain updates regularly, e.g., once per day, or whenever the user's computer is connected to the Internet. Alternatively, the control module 115 may continuously monitor the URL to find new uploads.

The user may consume the music files in the "Subscription" folder when he has time. The user's activities may be recorded, and the user preferences may be updated. With the subscription function, the user may consume media he likes without having to manually open websites again and again. It should be understood that the method shown in FIG. 4 may be provided in addition to that shown in FIG. 3.

Figure 5:
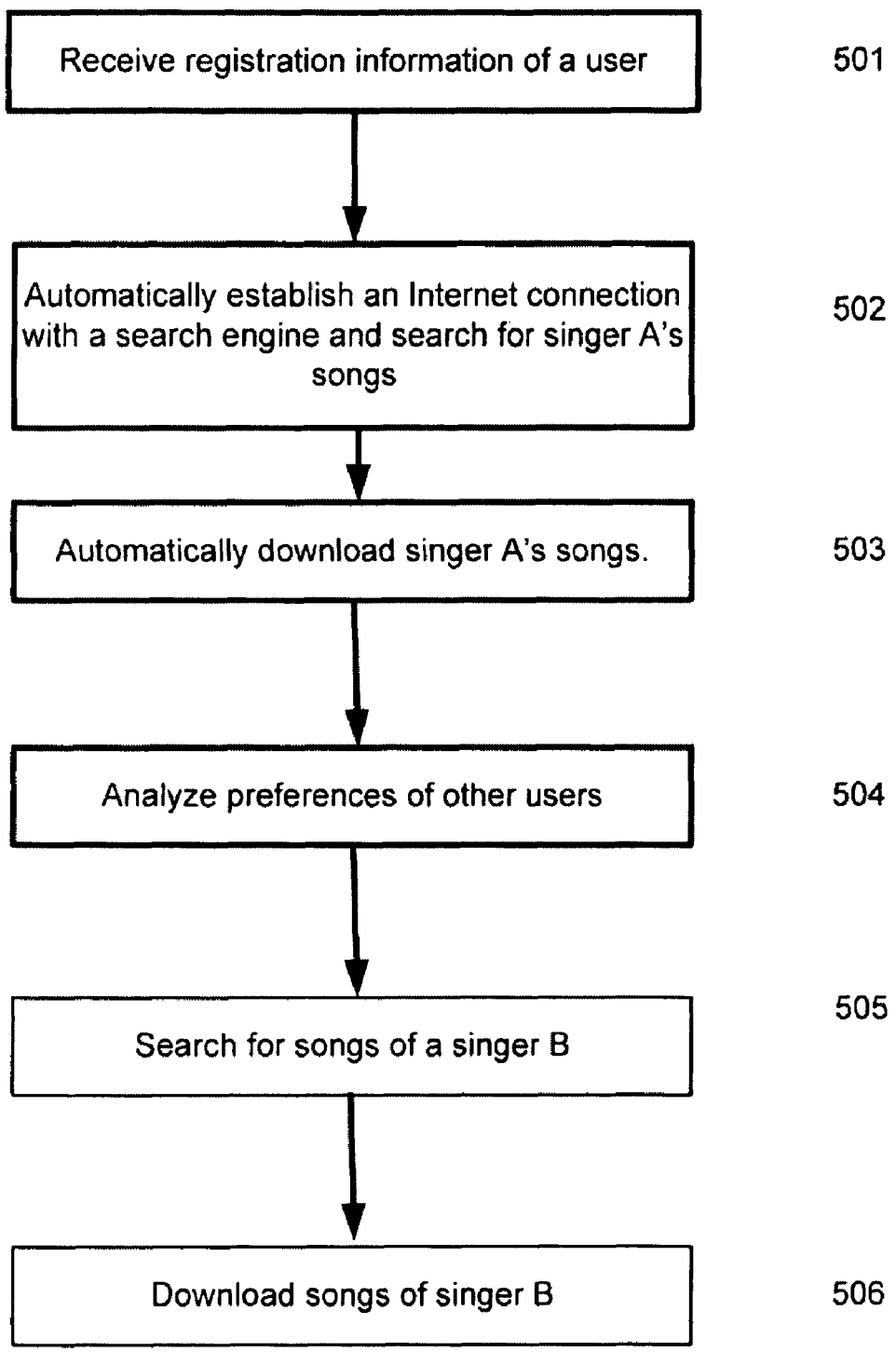
FIG. 5 illustrates a flow chart of a method for retrieving and organizing web media according to another embodiment of the present invention.

FIG. 5 illustrates a flow chart of a method for retrieving and organizing web media according to another embodiment of the present invention. In this embodiment, a user may be one of a plurality of registered users of the external server 121, and may access the external server 121 through a media sink user interface on his computer.

At 501, a user may register with the external server 121. During the registration, the user may provide personal information (e.g. demographic, geographic and biographic, psychographic, etc.) and his preferences, e.g., songs of a singer A.

At 502, the external server 121 may initiate an Internet connection with a search engine and search for songs of singer A.

At 503, songs of the singer A may be downloaded. In one embodiment, the downloaded music files may be saved in the centralized depository in the external server in a folder for the user and a subfolder named, e.g., "New." In another embodiment, the downloaded music files may be saved on the user's local drive(s).

At 504, the analysis module 116 may analyze preferences of other users with data in the central depository, i.e. collaborative filtering. If, e.g., 80% of users who like singer A also like singer B, the external server may search the Internet for songs of singer B at 505, and download songs of singer B and save them in the centralized depository in a folder for the user and a subfolder named, e.g., "Recommendations," at 506 In one embodiment, the external server may run a feature extraction for music for songs of the singer A, and search for songs with similar feature extractions and save them for the user.

In one embodiment, the user may request to search for media that is similar to a set of media which they have grouped together using a specific tag. The external server may generate a list of media which has also been given the same tag by other users, or the server may use the results of its content analysis and create a model of acoustic similarity associated with each tag, and then return a list of media which is acoustically similar to other media which have been assigned the same tag by other users.

In one embodiment, the user may request to search for media from other users with similar personal information and preferences, i.e. affinities. The external server may generate a list of media which matches users having some of the same characteristics, e.g. the same age and gender, the same stated preference for a music genre, etc.

In one embodiment, instead of comparing registration information of one user with that of other users, the external server may infer a user's preferences by analyzing the web media the user has kept and the web media the user has deleted, and any associated ratings, and then may compare the user's preferences with those of other users, and decide the web media to recommend to the user.

In one embodiment, if the external server finds several copies of a song, it may compare their signal quality and only save and recommend the one with the best quality.

The user's activities may be recorded and the user preferences may be updated. It should be understood that the method shown in FIG. 5 may be provided in addition to that shown in FIG. 3 and/or FIG. 4.

It should be understood that the methods shown in FIGS. 3, 4 and 5 may be controlled by a media sink on the desktop of a user's computer, or by the external server. When the methods are controlled by the desktop media sink, the users' activity information and preferences may be sent to the central depository and saved there.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for retrieving and organizing web media, said method comprising:
receiving, at an application, a first input of a first Uniform Resource Locator (URL) that corresponds to a first web page that has first HTML and one or more first media objects referenced in the first HTML;
in response to the first input, the application performing the steps of:
automatically establishing an Internet connection to retrieve the first web page according to the first URL;
analyzing the first HTML of the first web page without rendering any visual display of the first webpage, to identify the one or more first media objects referenced in the first HTML;
automatically downloading the one or more first media objects;
storing the one or more first media objects in persistent storage;
receiving, at the application, a second input of a second URL that corresponds to a second web page that has second HTML and one or more second media objects referenced in the second HTML;
in response to the second input, the application performing the steps of:
automatically establishing an Internet connection to retrieve the second web page according to the second URL;
analyzing the second HTML of the second web page without rendering any visual display of the second webpage, to identify the one or more second media objects referenced in the second HTML;
automatically downloading the one or more second media objects;
storing the one or more second media objects in persistent storage; and
the application displaying visual representations of a plurality of downloaded media objects that were referenced in a plurality of distinct web pages whose URLs were provided to the application, wherein the visual representations that are displayed by the application include visual representations for at least the one or more first media objects and the one or more second media objects;
wherein the method is performed by one or more computing devices.

2. The method of claim 1, where the first input and the second input further comprise dropping a URL onto a visual representation associated with the application.

3. The method of claim 1, wherein at least one of the first input and the second input is a subscription to a URL.

4. The method of claim 1, wherein the visual representations of the plurality of downloaded media objects are ordered, by the application, according to a user's preferences.

5. The method of claim 1, further comprising: collecting user activity information from at least one of:
downloaded media objects the user has kept, downloaded media objects the user has deleted, and user ratings for downloaded media objects.

6. The method of claim 5, further comprising: inferring the user's preferences from the user activity information.

7. The method of claim 5, further comprising: updating the user's preferences with the user activity information.

8. The method of claim 5, further comprising: providing recommendations of at least one third media object based, at least in part, on the user's preferences.

9. The method of claim 8, wherein the recommendations are based on other users' preferences.

10. The method of claim 8, wherein the recommendations are based on feature extraction for music.

11. The method of claim 8, wherein the recommendations are based on ratings associated with the plurality of downloaded media objects.

12. The method of claim 5, further comprising: saving the user activity information in a central depository.

13. The method of claim 12, further comprising: searching the central depository for one or more third media objects according to a user's affinities.

14. The method of claim 1, further comprising: when there are at least two copies of a downloaded media object of the plurality of downloaded media objects, comparing signal quality of the at least two copies and saving a single copy with the best signal quality.

15. The method of claim 1, wherein analyzing the first and second HTML further comprises: identifying a file name extension of a hyperlink in the first and second HTML.

16. The method of claim 1, wherein analyzing the first and second HTML further comprises: identifying a media related microformat in the first and second HTML.

17. The method of claim 1, further comprising: grouping downloaded media files according to at least one attribute, wherein the at least one attribute is selected from the group consisting of: an author, a title, and a subject.

18. The method of claim 17, further comprising:
searching the Internet for one or more third media objects according to the at least one attribute; and
in response to the searching, the application automatically downloading the one or more third media objects identified by the at least one attribute.

19. A server computer, comprising:
an input module, for receiving, over a network, a first Uniform Resource Locator (URL) that corresponds to a first web page that has first HTML and one or more first media objects referenced in the first HTML, and for receiving, over a network, a second URL that corresponds to a second web page that has second HTML and one or more second media objects referenced in the second HTML;
a control module, for automatically establishing an Internet connection, to retrieve the first web page according to the first URL, and for automatically establishing an Internet connection to retrieve the second web page according to the second URL;
an analysis module, for analyzing the first HTML of the first web page without rendering, or sending over the network, any representation of the first web page, to identify the one or more first media objects referenced in the first HTML, and for analyzing the second HTML of the second web page without rendering, or sending over the network, any representation of the second web page, to identify the one or more second media objects referenced in the second HTML;
a downloading module, for automatically downloading the one or more first media objects, and for automatically downloading the one or more second media objects;
a data storage device, for storing the one or more first media objects downloaded from the first web page, and for storing the one or more second media objects downloaded from the second web page; and
a display module, for sending, over the network, visual representations of a plurality of downloaded media objects that were referenced in a plurality of distinct web pages, wherein visual representations include visual representations for the one or more first media objects and the one or more second media objects.

20. A non-transitory computer-readable medium storing one or more instructions for retrieving and organizing web media, wherein processing of the one or more instructions by one or more processors causes:
receiving, at an application, a first input of a first Uniform Resource Locator (URL) that corresponds to a first web page that has first HTML and one or more first media objects referenced in the first HTML;
in response to the first input, the application performing the steps of:
automatically establishing an Internet connection to retrieve the first web page according to the first URL;
analyzing the first HTML of the first web page without rendering any visual display of the first webpage, to identify the one or more first media objects referenced in the first HTML;
automatically downloading the one or more first media objects;
storing the one or more first media objects in persistent storage;
receiving, at the application, a second input of a second URL that corresponds to a second web page that has second HTML and one or more second media objects referenced in the second HTML;
in response to the second input, the application performing the steps of:
automatically establishing an Internet connection to retrieve the second web page according to the second URL;
analyzing the second HTML of the second web page without rendering any visual display of the second webpage, to identify the one or more second media objects referenced in the second HTML;
automatically downloading the one or more second media objects
storing the one or more second media objects in persistent storage; and
the application displaying visual representations of a plurality of downloaded media objects that were referenced in a plurality of distinct web pages whose URLs were provided to the application, wherein visual representations that are displayed by the application include visual representations for at least the one or more first media objects and the one or more second media objects;
wherein the method is performed by one or more computing devices.

* * * * *